| | | |
|---|---|---|
| United States Patent [19] | [11] Patent Number: | 4,990,254 |
| Toida et al. | [45] Date of Patent: | Feb. 5, 1991 |

[54] PORTABLE WATER PURIFIER

[75] Inventors: Shoji Toida; Takeshi Kuwana; Kazunori Iwasaki; Tooru Goto, all of Tokyo, Japan

[73] Assignee: Japan Oxygen Co., Ltd., Tokyo, Japan

[21] Appl. No.: 469,636

[22] Filed: Jan. 24, 1990

[30] Foreign Application Priority Data

Jan. 25, 1989 [JP] Japan .................................. 1-7267[U]

[51] Int. Cl.$^5$ .............................................. B01D 27/08
[52] U.S. Cl. .................................... 210/464; 210/472; 210/476; 210/477; 210/482
[58] Field of Search ............... 210/464, 465, 472, 473, 210/474, 476, 482, 282, 477

[56] References Cited

U.S. PATENT DOCUMENTS

| | | | |
|---|---|---|---|
| 341,068 | 5/1886 | Smith | 210/476 |
| 1,245,932 | 11/1917 | Larson | 210/476 |
| 1,267,417 | 5/1918 | Jones | 210/476 |
| 2,743,664 | 5/1956 | Dale | 210/476 |
| 3,696,931 | 10/1972 | Hough | 210/482 |
| 4,895,648 | 1/1990 | Hankammer | 210/474 |
| 4,946,591 | 8/1990 | Mealey | 210/482 |

Primary Examiner—Richard V. Fisher
Assistant Examiner—Cynthia L. Nessler
Attorney, Agent, or Firm—Armstrong, Nikaido, Marmelstein, Kubovcik and Murray

[57] ABSTRACT

A portable water purifier comprises an outer elongated hollow body having openings formed at the upper and lower portions, a cup adapted to be inserted in the outer elongated hollow body from the lower opening thereof, a filtering elongated hollow body adapted to be inserted in the cup from the upper opening of the outer elongated hollow body, and a cap fitted detachably on the upper portion of the outer elongated hollow body to cover this upper opening. The cup and the filtering elongated hollow body are accommodated in the outer elongated hollow body when the portable water purifier is not used in a portable manner. When this portable water purifier is used, the cup is pulled out from the outer elongated hollow body and is set under the outer elongated hollow body, so that water is poured from the upepr opening of the outer elongated hollow body and is filtered through a filter in the filtering elongated hollow body. The filtered water is stored in the cup.

8 Claims, 11 Drawing Sheets

PORTABLE WATER PURIFIER

BACKGROUND OF THE INVENTION

1. Field of the Invention

The present invention generally relates to a portable water purifier, and, more particularly, to a portable water purifier which can easily purify river water, rain water or the like to be suitable as drinking water.

2. Description of the Related Art

Conventional water purifiers have a filter provided at the bottom of an elongated hollow body, for example. In actual use, such a water purifier is placed on or over the proper type of cup and water is poured into the water purifier. As a result, the water is purified by the filter, then drops into the cup, and the filtered water stored there serves as drinking water.

Without a handy cup around, therefore, the conventional water purifiers are inconvenient to use. This water purifier and a cup carried separately would certainly become bulky and inconvenience the carrier.

SUMMARY OF THE INVENTION

Accordingly, it is an object of this invention to provide a portable water purifier which has a filtering elongated hollow body and a cup necessary for water purification accommodated compact in an outer elongated hollow body.

According to one aspect of the invention, there is provided a water purifier comprising an outer elongated hollow body having openings at top and bottom portions, a body portion with an inner wall and an engaging protrusive portion provided on the inner wall of the body portion at a lower portion thereof; a cup adapted to be fitted into the outer elongated hollow body from the lower opening thereof and having a body portion with an outer wall and a stopper projection provided on the outer wall of, and at a lower portion of, the body portion thereof, the stopper projection sliding over the protrusive portion of the outer elongated hollow body to come in engagement with the protrusive portion when the cup is fitted in the outer elongated hollow body; a filtering elongated hollow body adapted to be fitted in the cup from the upper opening of the outer elongated hollow body and having a flange at a periphery of an upper portion thereof, the flange being engageable with an upper edge of the outer elongated hollow body; and a cap fitted detachable on an upper portion of the outer elongated hollow body to cover the upper opening thereof.

With the portable water purifier with the above structure not in use as is a case where it is being carried, therefore, the cup and filtering elongated hollow body can be accommodated in the outer elongated hollow body, thus shortening the overall length and making it compact to be convenient for better portability. In addition, as both the cup and filter elongated hollow body are protected by the outer elongated hollow body, they can be prevented from possible damage caused while being carried.

If the outer elongated hollow body, cup, filtering elongated hollow body and cap are designed to have a circular or an oval lateral cross section, i.e., without square corners, stains are difficult to remain on the water purifier, thus facilitating cleaning.

If a top plate is formed of a flexible material and a cap having an air hole formed in the top plate is used, pressing the top plate while sealing the air hole pressurizes the inside of the filtering elongated hollow body, thus shortening the filtration time.

BRIEF DESCRIPTION OF THE DRAWINGS

FIGS. 1 through 8 show the first embodiment of a portable water purifier according to the present invention, in which:

FIGS. 9 through 15 show the second embodiment of a portable water purifier according to this invention, in which:

FIGS. 16 and 17 show the third embodiment of a portable water purifier of this invention, in which:

DETAILED DESCRIPTION OF THE PREFERRED EMBODIMENTS

Two preferred embodiments of a portable water purifier according to this will now be described referring to the accompanying drawings.

FIGS. 1 to 8 illustrate the first embodiment of a portable water purifier of the present invention.

Figure 1:
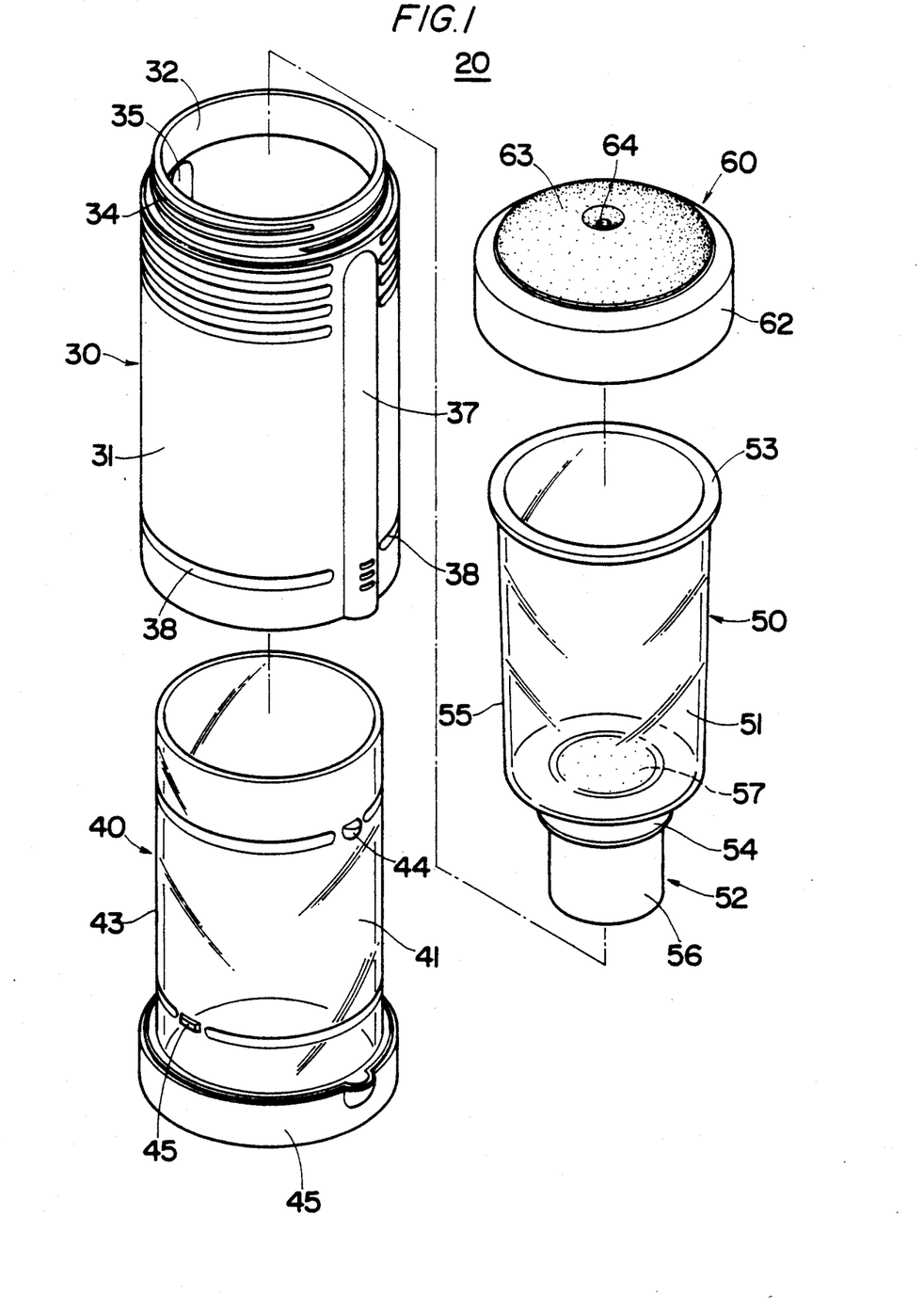
FIG. 1 is an exploded perspective view of the portable water purifier.
Figure 2:
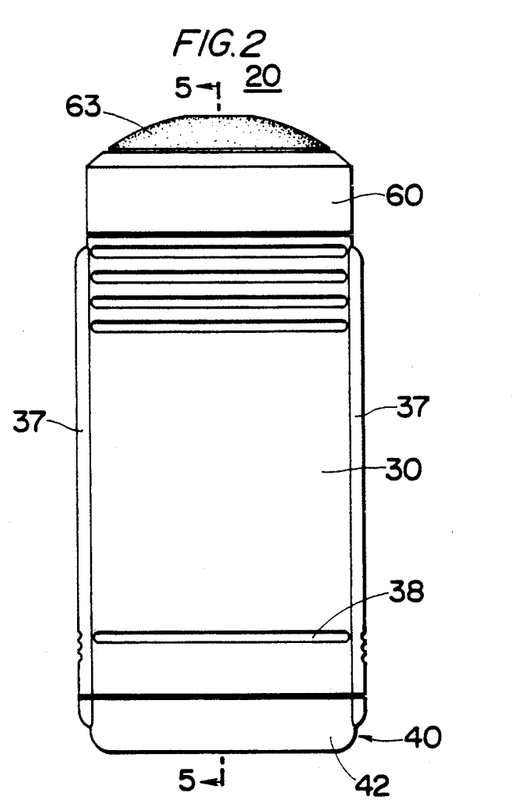
FIG. 2 is a front view illustrating an outer elongated hollow body accommodating a cup and a filtering elongated hollow body.
Figure 3:
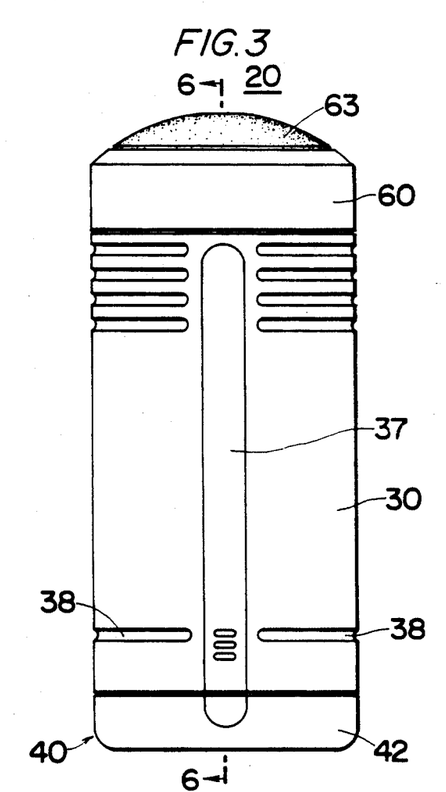
FIG. 3 is a side view of the same.
Figure 4:
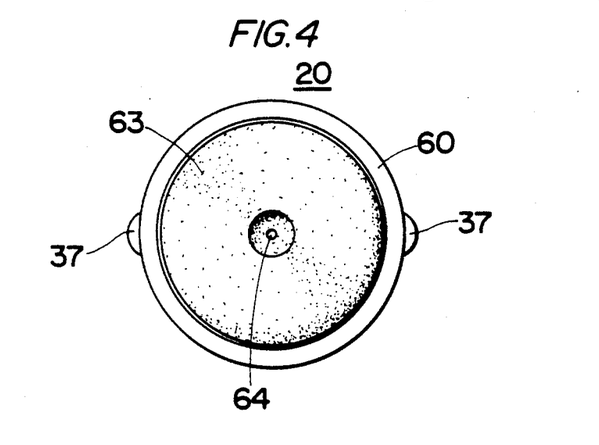
FIG. 4 is a plan view of the same.
Figure 5:
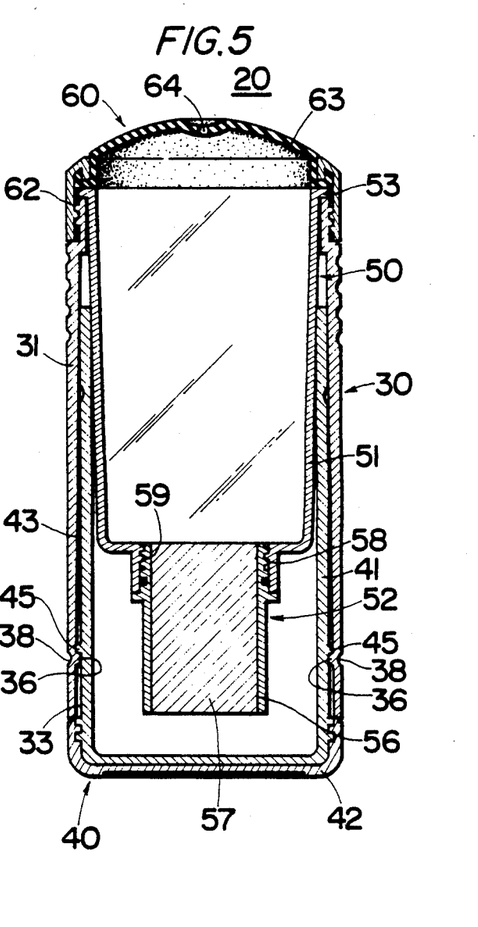
FIG. 5 is a cross-sectional view taken along the line 5—5 in FIG. 2.
Figure 6:
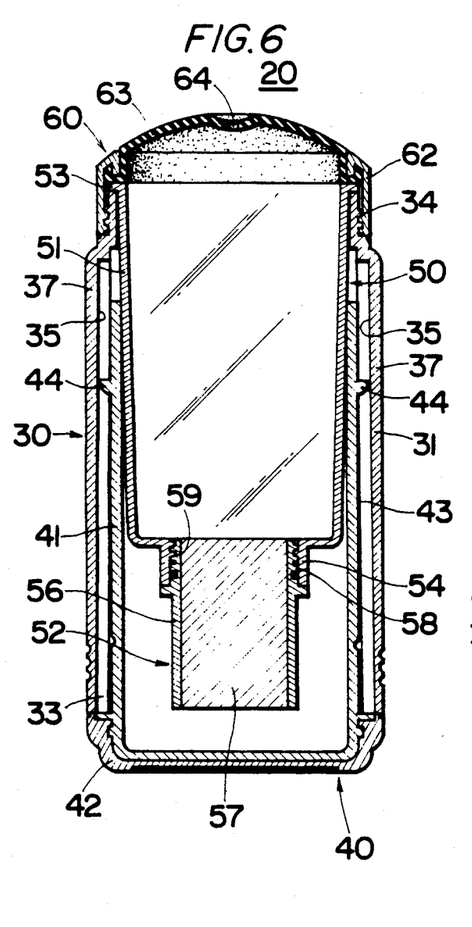
FIG. 6 is a cross-sectional view taken along the line 6—6 in FIG. 3.

A portable water purifier 20 comprises an outer elongated hollow body 30, a cup 40, a filtering elongated hollow body 50 and a cap 60, which are all formed to have a circular lateral cross section.

The outer elongated hollow body 30 has openings 32 and 33 respectively formed in the top and bottom of a body portion 31. A male screw portion 34 which detachably engages the cap 60 is formed at the upper periphery of the body portion 31. A pair of elongated grooves 35 and 35 are formed in the inner wall of the body portion 31, facing each other and extending from the bottom portion to the top portion thereof. Engaging protrusive portions 36 are formed at the bottom portion of the body portion 31, with the grooves 35 in between. On the outer wall of the body portion 31, two protrusive columns 37 and two recesses 38 are formed due to the formation of the grooves 35 and the formation of the engaging protrusive portions 36, respectively.

The cup 40 includes a transparent elongated hollow body 41 with the bottom and a stand 42 fitted over the lower portion of this body 41. The body 41 has a body portion 43 whose outer diameter is smaller than the inner diameter of the body portion 31 of the outer elongated hollow body 30. The outer diameter of the stand 42 is substantially equal to that of the body portion 31. A pair of holder protrusive portions 44 are formed, facing each other, on the upper portion of the outer wall of the body portion 43, and a pair of stopper projections 45 facing each other are formed at the lower portion with a phase shift of 90° from the phases of the holder protrusive portions 44. The holder protrusive portions 44 support the bottom edge of the body 30 when the portable water purifier is in use, and they are positioned in the grooves 35 of the body 30 when the cup 40 is accommodated therein. When the cup 40 is inserted in the body 30, the stopper projections 45 slide over the engaging protrusive portions 36 on the body 30 to come in respective engagement therewith, thus maintaining the state in which the cup 40 is unused.

The filtering elongated hollow body 50 comprises a transparent elongated hollow body 51 and a filter 52 provided detachable at the bottom of the body 51. The body 51 has a flange 53 provided at the upper periphery, which flange serves to suspend the body 50 when engaged with the top edge of the outer elongated hollow body 30. A cylindrical attaching portion 54 for fastening the filter 52 protrudes from the bottom of the body 51. The body 51 has a body portion 55 formed in taper shape in such a way that its outer diameter at the upper portion is smaller than the internal diameter of the upper opening 32 of the body 30 and it becomes narrower downward. With this taper shape, the body 51 can be fitted in the cup 40. The outer diameter of the attaching portion 54 is smaller than that at the lower end of the body portion 55. The filter 52 comprises an elongated hollow body 56 and a filtering member 57 filled in the body 56 in exchangeable manner. The filter 52 is attached to the body 51 by causing a male screw 58 formed at the upper outer surface of the body 56 to engage a female screw 59 formed at the inner wall of the attaching portion 54.

The cap 60 comprises a ring-shaped holder 62 having a female screw 61 engageable with the male screw portion 34 of the outer elongated hollow body 30, and a top plate 63 fitted over the holder 62. The top plate 63 is made of a flexible material such as rubber, slightly protruding upward, and has an air hole 64 formed therein at the top.

This embodiment has the above-described structure, and when unused as in a case where the water purifier is being carried, the cup 40 and filtering elongated hollow body 50 may be accommodated within the outer elongated hollow body 30, as shown in FIGS. 2 to 6. More specifically, the cup 40 is fitted in the body 30 from the lower opening 33, with its holder protrusive portions 44 aligned with the grooves 35, and is held in the body 30 as the stopper projections 45 sliding over the protrusive portions 36 to be engaged therewith. As the body 50 is put in the cup 40 from the top opening 32 of the body 30 and the cap 60 is fastened to the male screw portion 34 of the body 30, the flange 53 is held by the upper edge of the body 30 and the cap 60.

Accordingly, most of the cup 40 and the filtering elongated hollow body 50 are accommodated in the elongated hollow body 30, the cup 40 engaging the body 30, and the body 50 is held against the body 30 by the cap 60. The body 30, cup 40, body 50 and cap 60 are therefore not separated from one another, with the entire length of the assembly being substantially equal to the length of the body 30. That is, the entire length is short and the assembly can be made compact, which is advantageous for better portability.

Figure 7:
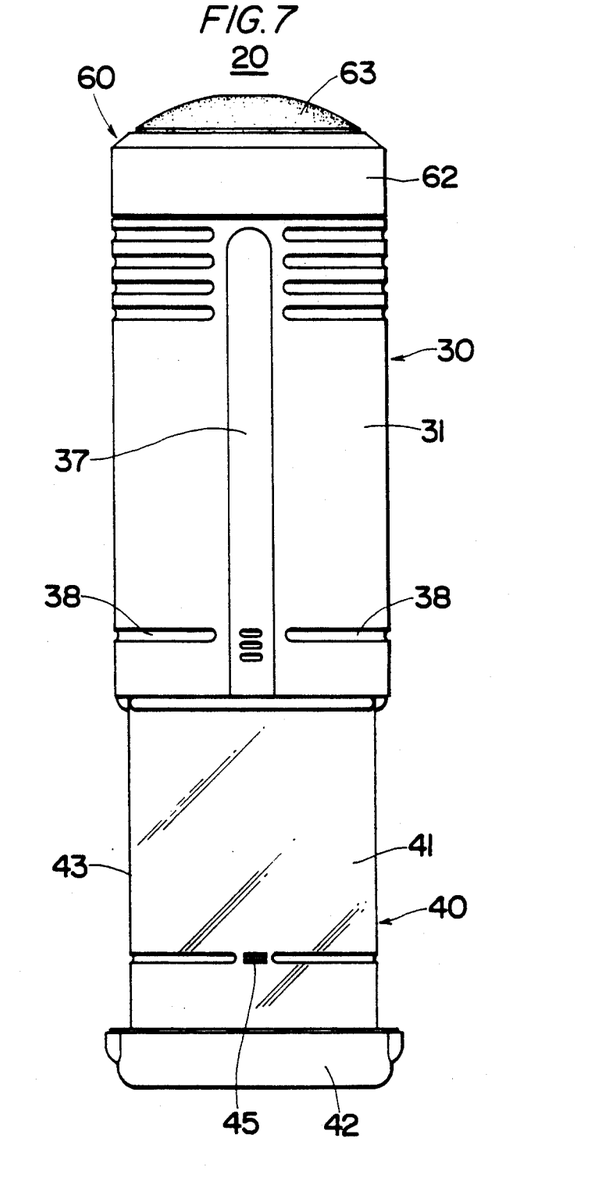
FIG. 7 is a front view showing the portable water purifier in use.
Figure 8:
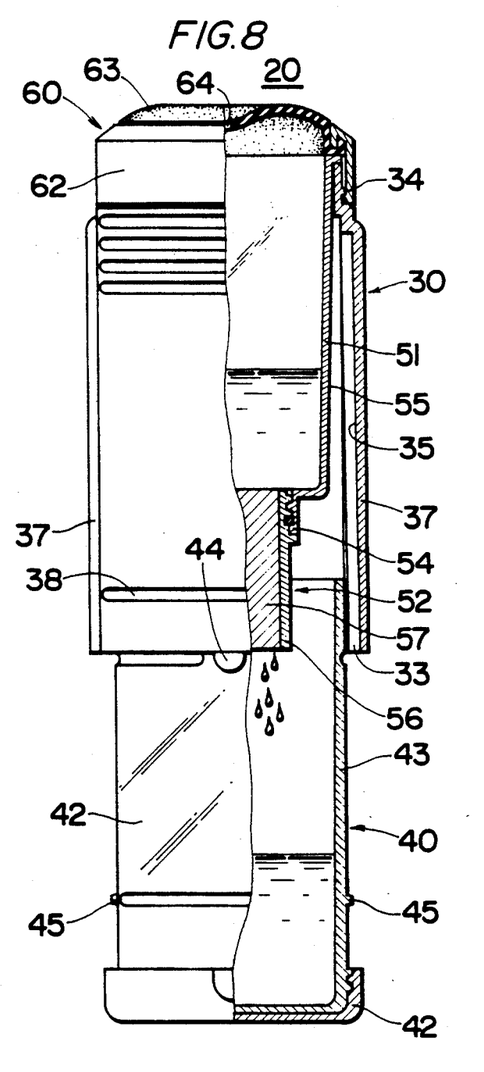
FIG. 8 is a partly cross-sectional side view of the same.

In using this portable water purifier, the cup 40 should be pulled out from the outer elongated hollow body 30, either one should be twisted with respect to the other to support the lower edge of the body 30 by the holder protrusive portions 44 and place the body 30 over the cup 40. When pouring water into the filtering elongated hollow body 50 through the upper opening 32 of the body 30 with the cap 60 removed, water is filtered in the filter 52 and clean water drops in the cup 40, as shown in FIGS. 7 and 8.

At this time, when the cap 60 is fastened on the outer elongated hollow body 30, the top plate 63 is pressed while sealing the air hole 64 with a finger, then finger pressure is released from the top plate 63, the air hole 64 is open and is returned to the original shape due to the resilient force of the top plate 63. Repeating this operation pressurizes the inside of the filtering elongated hollow body 50 and increases the water filtration speed in the body 50, thus shortening the required filtration time.

FIGS. 9 to 15 illustrate the second embodiment of a portable water purifier of the present invention.

Figure 9:
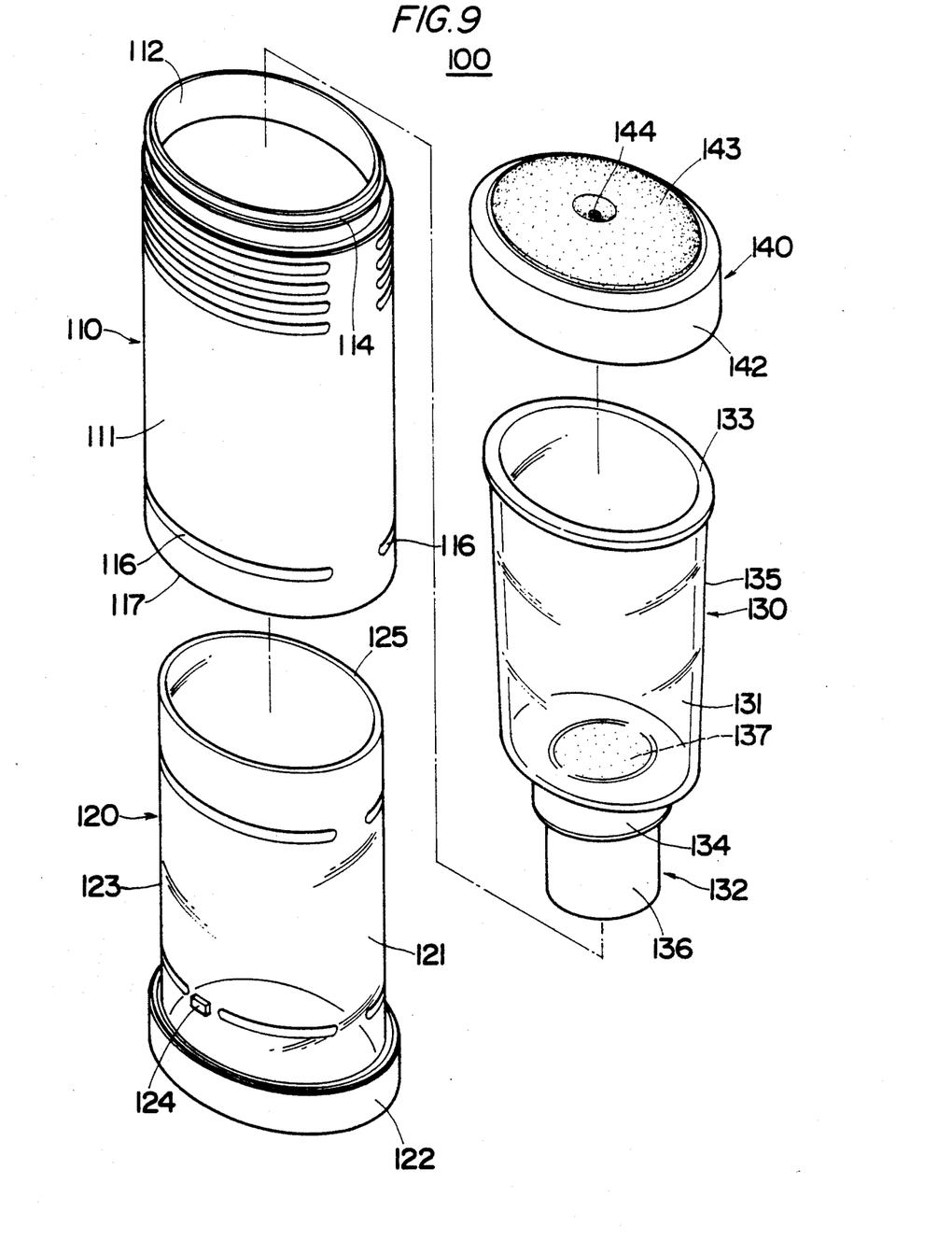
FIG. 9 is an exploded perspective view of the portable water purifier.
Figure 10:
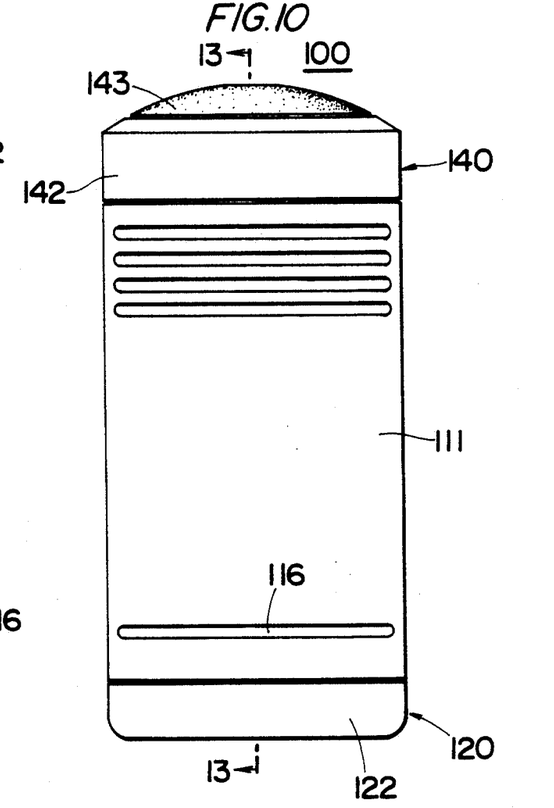
FIG. 10 is a front view illustrating an outer elongated hollow body accommodating a cup and a filtering elongated hollow body.
Figure 11:
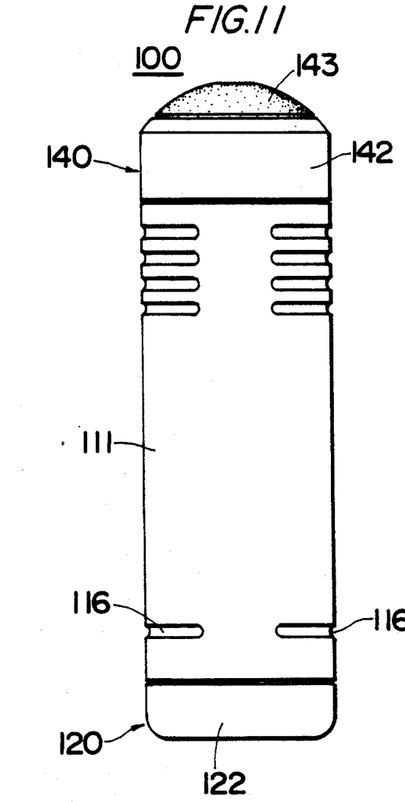
FIG. 11 is a side view of the same.
Figure 12:
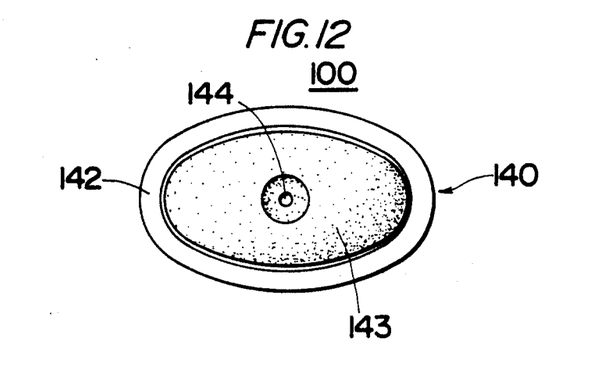
FIG. 12 is a plan view of the same.
Figure 13:
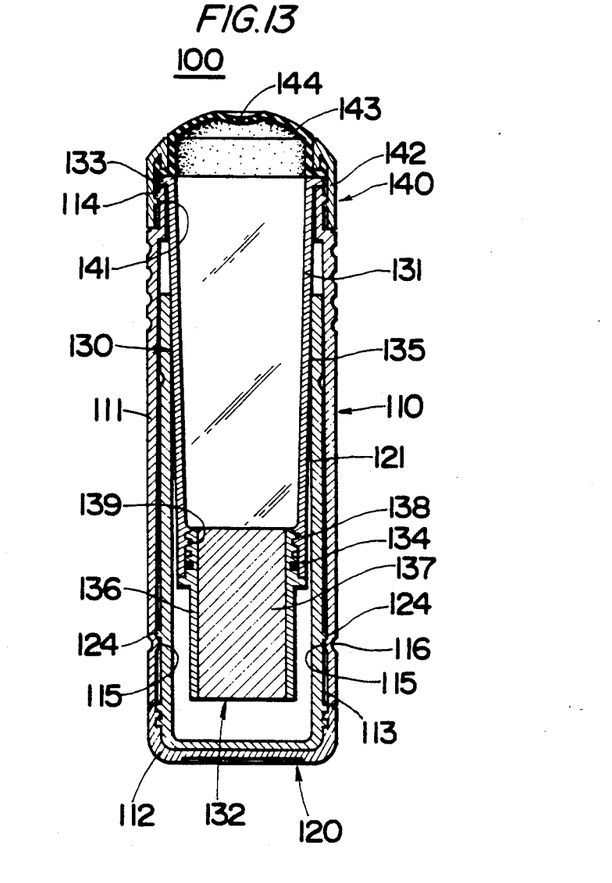
FIG. 13 is a cross-sectional view taken along the line 13—13 in FIG. 10.

A portable water purifier 100 comprises an outer elongated hollow body 110, a cup 120, a filtering elongated hollow body 130 and a cap 140, which are all formed to have an oval lateral cross section.

The outer elongated hollow body 110 has openings 112 and 113 respectively formed in the top and bottom of a body portion 111. A ring-shaped protrusive column 114 for detachably fitting the cap 140 is formed around the top portion of the body portion 111. Engaging protrusive portions 115 are formed on the inner wall of the body portion 111 at the bottom thereof, in such a manner as to face each other with the long axis of the oval in between. Recesses 116 are formed on the outer wall of the body portion 111 due to the formation of the engaging protrusive portions 115.

The cup 120 includes a transparent elongated hollow body 121 with the bottom and a stand 122 fitted over the lower portion of this body 121. The body 121 has a body portion 123 whose outer diameter is smaller than the inner diameter of the body portion 111 of the outer elongated hollow body 110. The outer diameter of the stand 122 is substantially equal to that of the body portion 111. Stopper projections 124 facing each other are formed at the lower portion on the outer wall of the body portion 123 of the body 121. When the cup 120 is inserted in the body 110, the stopper projections 124 slide over the engaging protrusive portions 115 on the body 110 to come in respective engagement therewith, thus maintaining the state in which the cup 120 is unused.

The filtering elongated hollow body 130 comprises a transparent elongated hollow body 131 and a filter 132 provided detachable at the bottom of the body 131. The body 131 has a flange 133 provided at the upper periphery, which flange serves to suspend the body 130 when engaged with the top edge of the outer elongated hollow body 110. A cylindrical attaching portion 134 for fastening the filter 132 protrudes from the bottom of the body 131. The body 131 has a body portion 135 formed in taper shape in such a way that its outer diameter at the upper portion is smaller than the internal diameter of the upper opening 112 of the body 110 and it becomes narrower downward. With this taper shape, the body 131 can be fitted in the cup 120. The outer diameter of the attaching portion 134 is smaller than that at the lower end of the body portion 135. The filter 132 comprises a cylindrical body 136 and a filtering member 137 filled in the body 136 in exchangeable manner. The filter 132 is attached to the body 131 by causing a male screw 138 formed at the upper outer surface of the body 136 to engage a female screw 139 formed at the inner wall of the attaching portion 134.

The cap 140 comprises a ring-shaped holder 142 having a protrusive column 141 which slides over the protrusive column 114 of the outer elongated hollow body 110, and a top plate 143 fitted over the holder 142. The top plate 143 is made of a flexible material such as rubber, slightly protruding upward, and has an air hole 144 formed therein at the top.

With the above-described structure of the second embodiment, when unused as in a case where the water purifier is being carried, as per the first embodiment, most of the cup 120 and the filtering elongated hollow body 130 are accommodated in the outer elongated hollow body 110, the cup 120 engaging the body 110, and the body 130 is held against the body 110 by the cap 140, as shown in FIGS. 10-13. The body 110, cup 120, body 130 and cap 140 become integral with one another and are kept held together, with the entire length of the assembly being substantially equal to the length of the body 110. That is, the entire length is short and the assembly can be made compact, which is advantageous for better portability.

Figure 14:
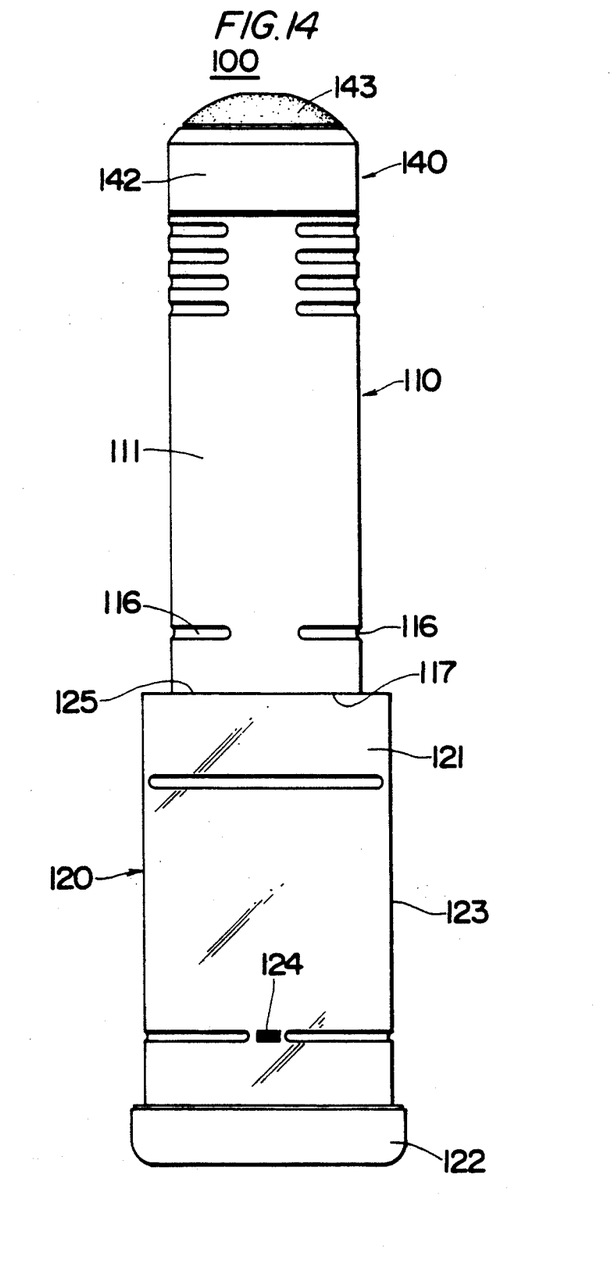
FIG. 14 is a front view showing the portable water purifier in use.
Figure 15:
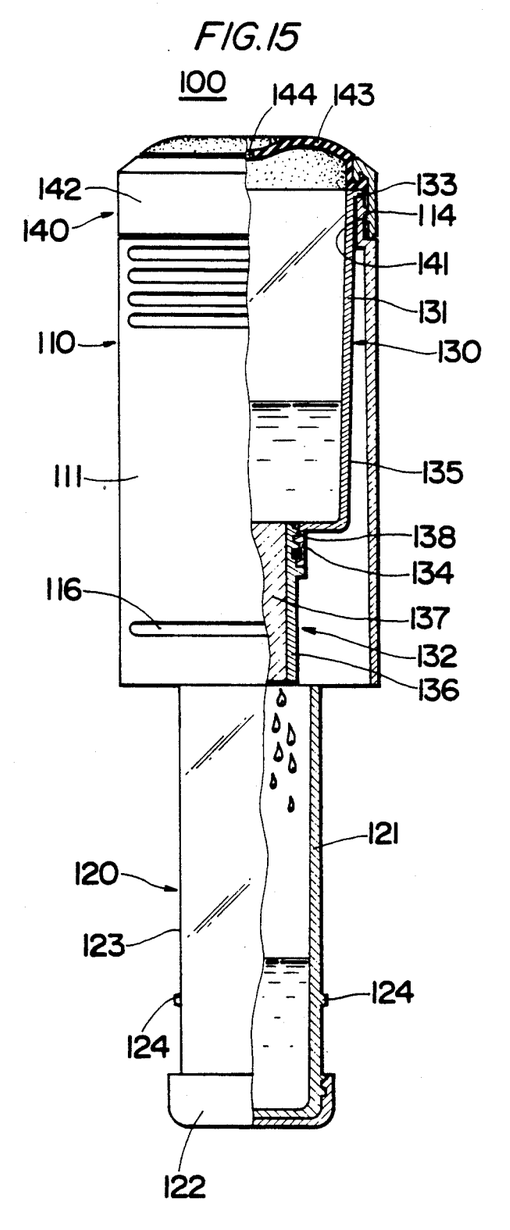
FIG. 15 is a partly cross-sectional side view of the same.

In using this portable water purifier, the cup 120 should be pulled out from the outer elongated hollow body 110, either one should be twisted with respect to the other to support the lower edge 117 of the body 110 by the upper edge 125 of the cup 120 and place the body 110 over the cup 120, thus permitting water filtration as per the first embodiment.

According to this embodiment, the portable water purifier 100 has an oval lateral cross section and is thus easy to hold and is difficult to roll.

Since the portable water purifier in either embodiment does not have square corners, stains are difficult to remain on the water purifier, thus facilitating cleaning.

Figure 16:
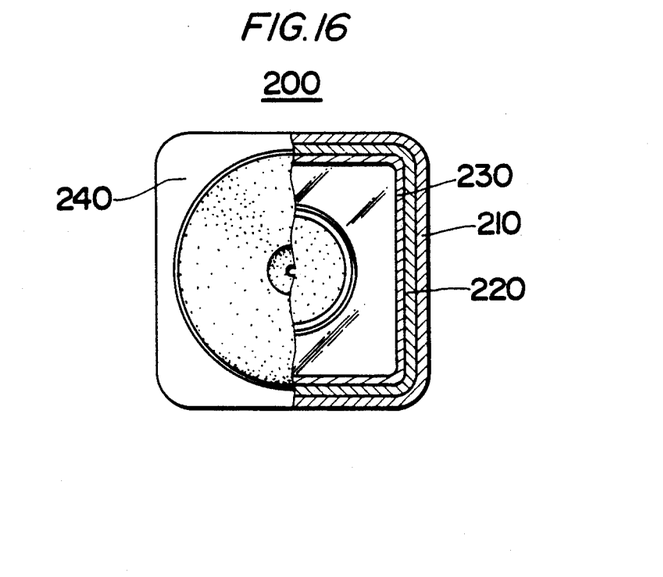
FIG. 16 is a partly cross-sectional plan view of the portable water purifier.
Figure 17:
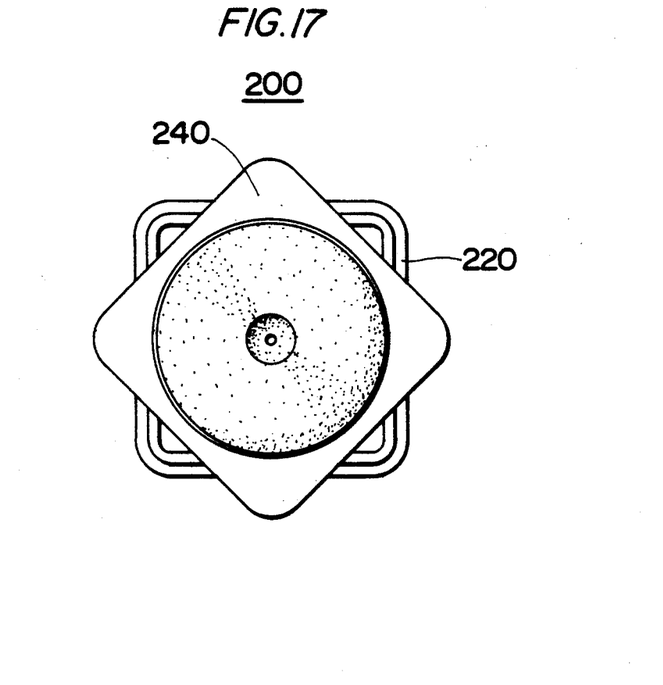
FIG. 17 is a plan view illustrating the portable water purifier in use.

FIGS. 16 and 17 illustrate the third embodiment of a portable water purifier of the present invention.

A portable water purifier 200 comprises an outer elongated hollow body 210, a cup 220, a filtering elongated hollow body 230 and a cap 240, which are all formed to have a square cross section.

With the water purifier having such a square cross section, if the corner portions are rounded, stains are difficult to remain on the water purifier, thus facilitating cleaning.

This embodiment has the same structure as the second embodiment with the exception of its cross section being a square, and it is therefore used in the same manner as has been explained with reference to the second embodiment.

A modification to design the outer elongated hollow body 210, cup 220, filtering elongated hollow body 230 and cap 240 to have a rectangular cross section is also included in the third embodiment.

What is claimed is:

1. A water purifier comprising:

an outer elongated hollow body having openings at top and bottom portions, an outer body portion with an inner wall and an engaging protrusive portion provided on said inner wall of said outer body portion at a lower portion thereof;

a cup adapted to be fitted into said outer elongated hollow body from said lower opening thereof and having a cup body portion with an outer wall and a stopper projection provided on said outer wall of, and at a lower portion of, said cup body portion thereof, said stopper projection sliding over said protrusive portion of said outer elongated hollow body to come in engagement with said protrusive portion when said cup is fitted in said outer elongated hollow body;

a filtering elongated hollow body adapted to be fitted in said cup from said upper opening of said outer elongated hollow body, having a flange at a periphery of an upper portion thereof, said flange being engageable with an upper edge of said outer elongated hollow body, and having a filter disposed in a lower portion thereof; and a cap fitted detachable on an upper portion of said outer elongated hollow body to cover said upper opening thereof.

2. A portable water purifier according to claim 1, wherein said outer elongated hollow body, said cup, said filtering elongated hollow body and said cap have a circular lateral cross section, said outer elongated hollow body has a vertical elongated groove formed in said inner wall of said outer body portion, extending from a lower end thereof to an upper portion thereof, and said cup has a holder protrusive portion formed at an upper outer wall thereof for, when used, supporting a lower edge of said outer elongated hollow body, said holder protrusive portion being located in said groove of said outer elongated hollow body when said cup is inserted therein.

3. A portable water purifier according to claim 1, wherein said outer elongated hollow body, said cup, said filtering elongated hollow body and said cap have an oval lateral cross section.

4. A portable water purifier according to claim 1, wherein said outer elongated hollow body, said cup, said filtering elongated hollow body and said cap have a square lateral cross section.

5. A portable water purifier according to claim 1, wherein said cap has a top plate formed of a flexible material and said top plate has an air hole formed therein.

6. A portable water purifier according to claim 5, wherein said outer elongated hollow body, said cup, said filtering elongated hollow body and said cap have a circular lateral cross section, said outer elongated hollow body has a vertical elongated groove formed in said inner wall of said outer body portion, extending from a lower end thereof to an upper portion thereof, and said cup has a holder protrusive portion formed at an upper outer wall thereof for, when used, supporting a lower edge of said outer elongated hollow body, said holder protrusive portion being located in said groove of said outer elongated hollow body when said cup is inserted therein.

7. A portable water purifier according to claim 5, wherein said outer elongated hollow body, said cup, said filtering elongated hollow body and said cap have an oval lateral cross section.

8. A portable water purifier according to claim 5, wherein said outer elongated hollow body, said cup, said filtering elongated hollow body and said cap have a square lateral cross section.

* * * * *